UNITED STATES PATENT OFFICE.

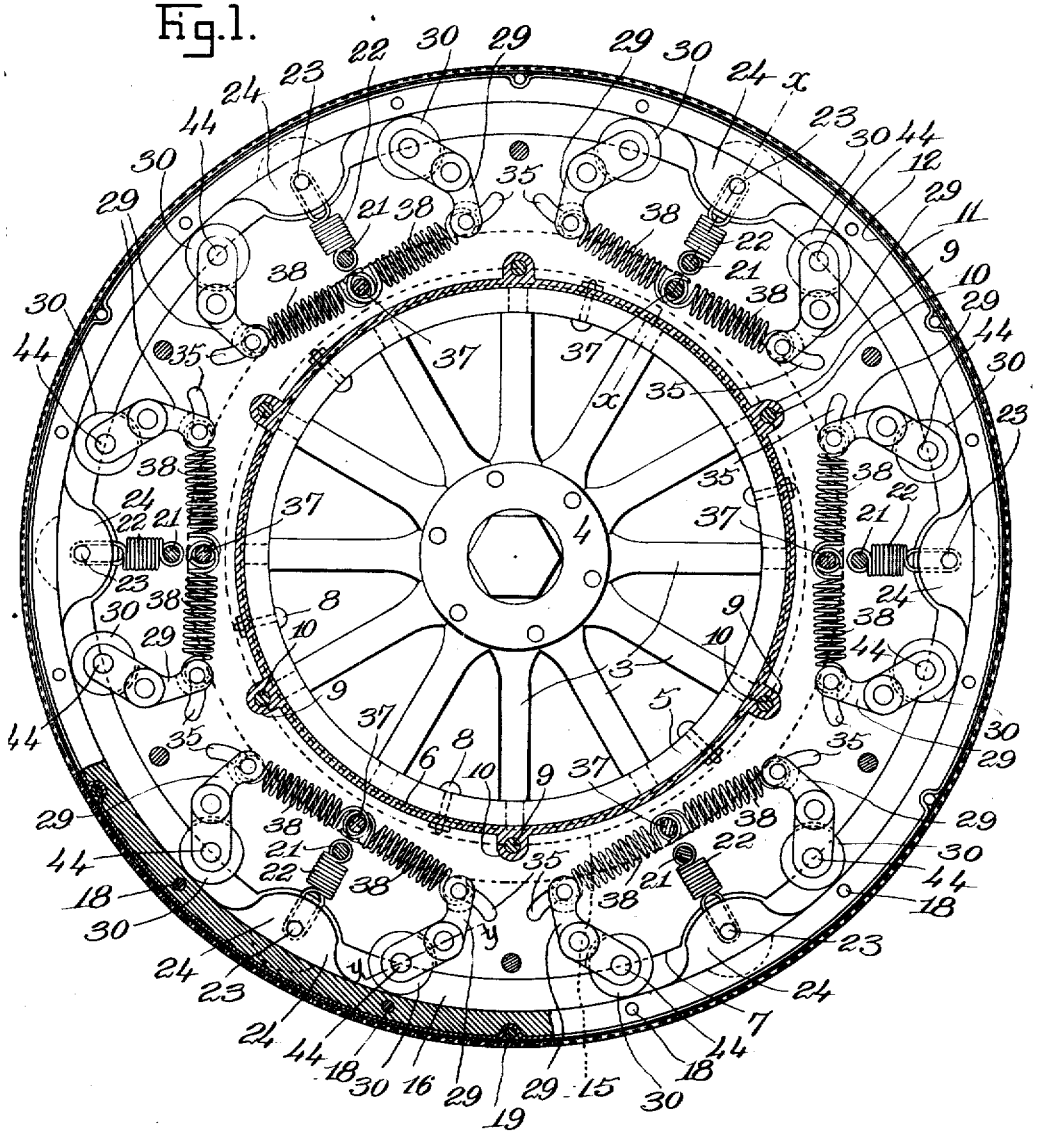

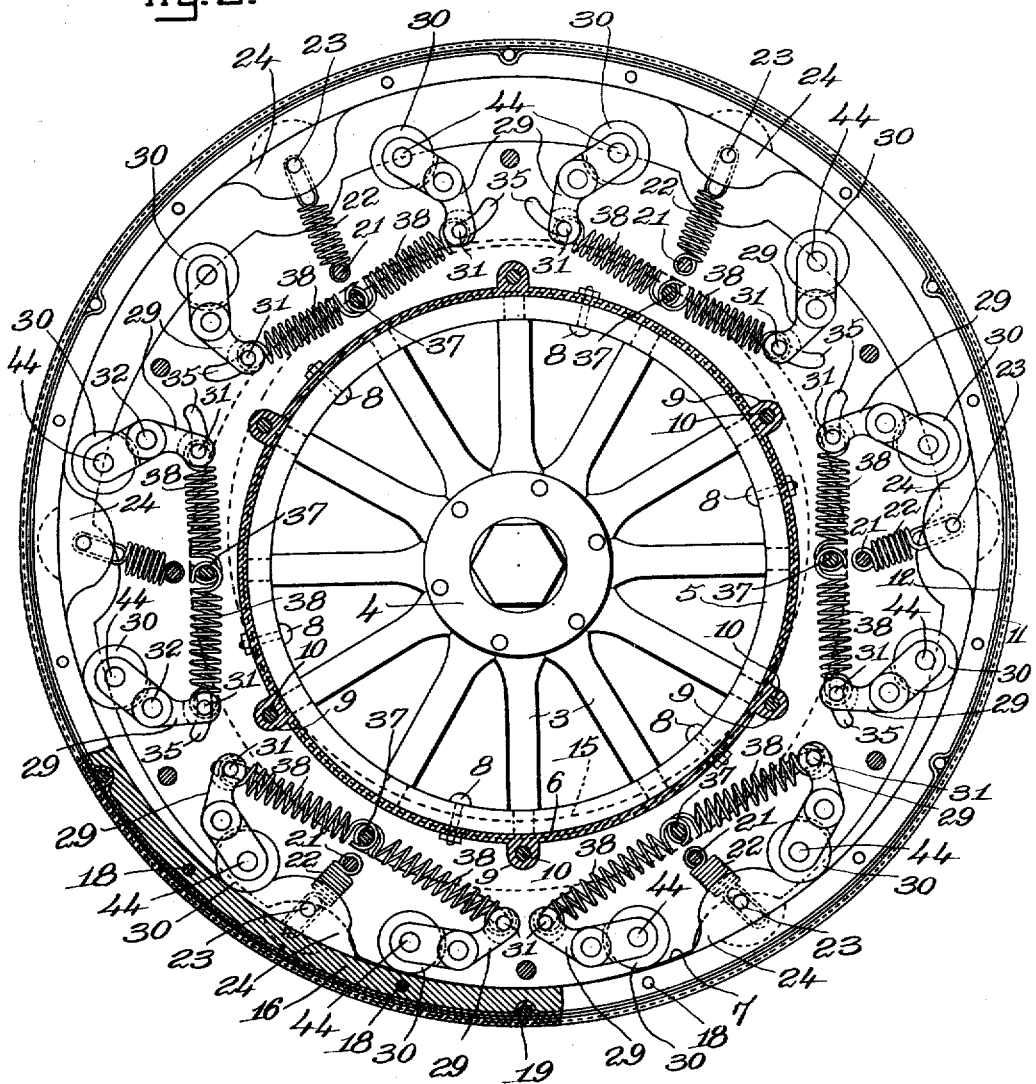

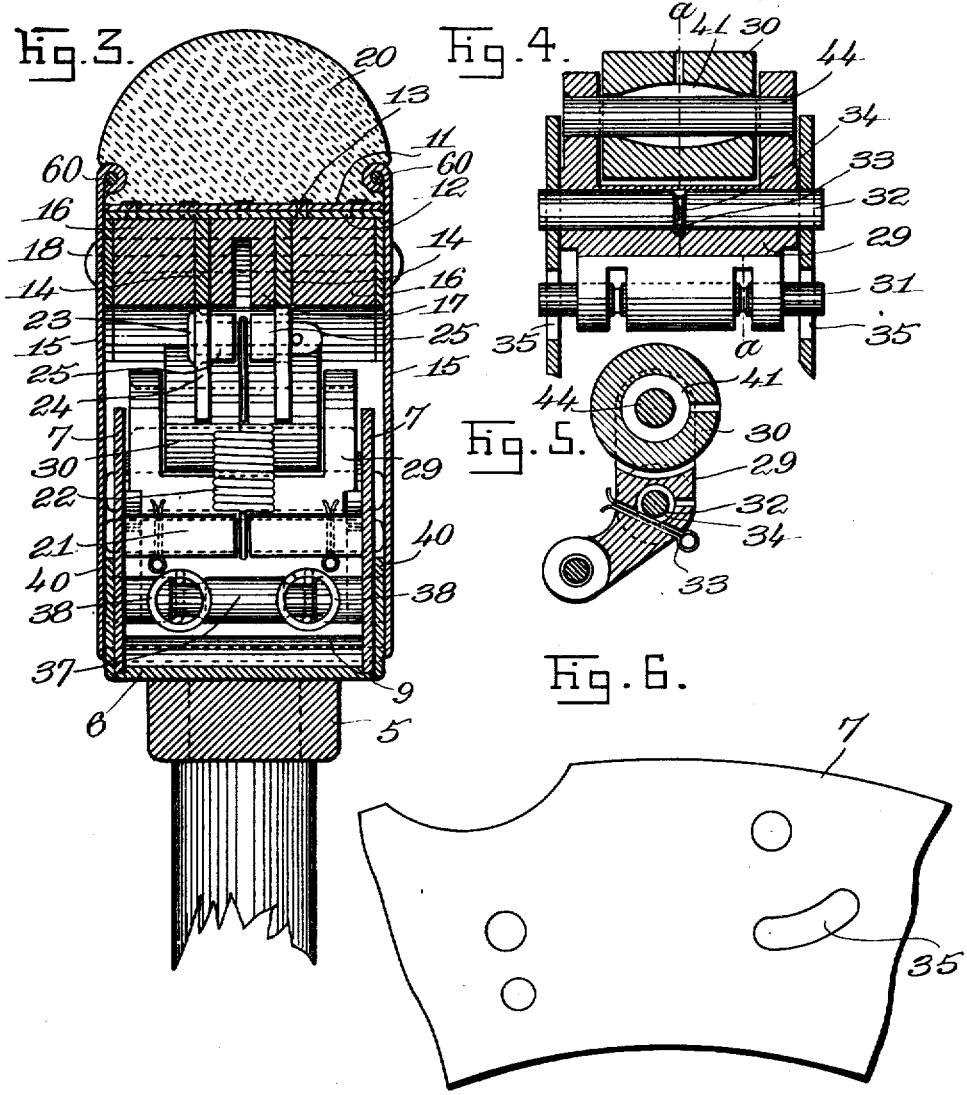

JOHN A STAHLE, OF BOSTON, AND CARL W. STAHLE, OF EVERETT, MASSACHUSETTS, ASSIGNORS, BY MESNE ASSIGNMENTS, TO STAHLE MECHANICAL TIRE COMPANY, LIMITED, A CORPORATION OF MAINE.

RESILIENT WHEEL.

1,124,349.  Specification of Letters Patent.  Patented Jan. 12, 1915.

Application filed April 7, 1910. Serial No. 554,017.

*To all whom it may concern:*

Be it known that we, JOHN A. STAHLE and CARL W. STAHLE, citizens of the United States, and residents of Boston, county of Suffolk, State of Massachusetts, and Everett, county of Middlesex, State of Massachusetts, respectively, have invented an Improvement in Resilient Wheels, of which the following description, in connection with the accompanying drawing, is a specification, like characters on the drawing representing like parts.

This invention relates to resilient wheels and has for its object to provide a novel wheel of this type which will be sufficiently resilient to take the place fully of pneumatic tires and which will be sufficiently rigid to withstand any lateral or other strain to which the wheel may be subjected when in use on automobiles or similar vehicles.

The features wherein our invention resides will first be described and then pointed out in the appended claims.

Referring to the drawings, Figure 1 is a vertical sectional view through a wheel embodying our invention; Fig. 2 is a similar view showing the position the parts would assume when the wheel is supporting a loaded truck; Fig. 3 is an enlarged sectional view on the line $x$—$x$, Fig. 1; Fig. 4 is an enlarged section on the line $y$—$y$, Fig. 1; Fig. 5 is a section on the line $a$—$a$, Fig. 4; Fig. 6 is a detail view of one of the side flanges of the inner rim.

The wheel comprises a wheel body having a hub and an inner rim and a continuous annular tread member in the form of an exterior rim which surrounds the wheel body and which is resiliently connected thereto, as will be hereinafter described. The wheel body is shown generally at 3 and it has the usual hub 4 by which it is applied to the axle and it is provided with a rim which comprises the usual annular wooden felly 5 to which is secured the metal rim or band 6 provided with the flanges 7. The rim member 6 is connected to the wooden felly 5 in any suitable way, as by means of bolts 8, and the rim 6 and flanges 7 may be connected in any suitable or convenient way. We have herein shown the rim 6 as provided with bosses 9 through which are passed the bolts 10 that extend through the flanges 7 thereby securing them to the rim 6. Situated exterior to the wheel body as thus constructed is an exterior rim on which is formed the tread surface of the wheel. This exterior rim comprises an annular body herein shown as made up of two or more sheet metal annular members 11 and 12 which are suitably secured together by rivets 13 and two or more rings 14 extending around the rim and situated on the inner side of the members 11 and 12 and two side flanges or plates 15 which are rigidly secured to the exterior rim and which overlie the flanges 7 extending from the wheel body, as clearly seen in Fig. 3. The rings 14 may be secured to the exterior rim in various ways without departing from the invention. As herein shown we employ annular wooden members 16, 17 which are situated inside of the rim members 11 and 12 and which serve to space the rings 14, the members 17 being placed between the rings, and the two members 16 being placed exterior to the rings and between the latter and the flanges 15, and said flanges, rings and spacing members being rigidly connected by suitable bolts 18.

The tread surface of the exterior rim may be either metal or rubber as desired. In Figs. 1 and 2, we have shown a simple metal tire 19, and in Fig. 3, we have shown a rubber tire 20. Either one may be employed as desired.

The exterior rim is connected to the wheel body by two sets of springs, and in the special manner to be described. The flanges 7 support a plurality of pins or cross bars 21 to each of which is connected one end of a contracting spiral spring 22 of one set, the other ends of said springs being secured to pins 23 carried by ears or stops 24 formed on the rings 14. In the embodiment of the invention herein shown the pins 23 are mounted in bushings 25 that in turn are flanged into the ears 24. These springs 22 are situated at suitable intervals around the wheel and any number of them may be employed. In small wheels it may be sufficient to have one spring only connected to each cross pin 21, but in larger wheels two or more of such springs arranged side by side might be connected to each cross bar.

The flanges 7 also have pivoted therein pairs of levers 29, each of which is pivotally mounted intermediate of its ends and the outer end of which is adapted to bear against the interior face of the exterior rim, while the inner end of which is acted on by suitable springs. These levers 29 are arranged in pairs, as above stated, and the levers of each pair are oppositely disposed, as seen in Figs. 1 and 2. Each lever is shown as pivotally mounted upon a pivotal pin 32 which is supported in the flanges 7 and we will preferably make each lever of a width substantially equal to the distance between the flanges, as shown in Fig. 4. Each lever carries at its inner end a suitable projection herein shown in the form of a stop pin 31 which plays in curved slots 35 formed in the flange 7, said slots and stop pin 31 serving to limit the swinging movement of the levers. The inner ends of the levers of each pair are yieldingly connected to each other by springs 38, and in the present embodiment of our invention, each lever is connected by its spring or springs 38 with a cross-bar or pin 37 carried by the flanges, said cross pins being situated between the levers of each pair. The arrangement of springs is such that the springs for any pair of levers are connected to the cross-bar between said levers, and, therefore, the springs 38 tend to swing the inner ends of the levers of each pair toward each other. The levers 29 are so shaped that when the parts are in their natural condition, as shown in Fig. 1, the outer ends of the levers incline relative to a radial line and the outer ends of the levers of each pair are arranged to incline toward each other. When a load is applied to the wheel, however, the wheel body will be forced downwardly, as shown in Fig. 2, and the engagement of the exterior rim with the outer ends of the levers on the underside of the tire will swing said levers about their axes, thus placing the springs 38 under tension and at the same time placing under tension the springs 22 at the upper part of the wheel body. During this movement of the levers 29, the outer ends will have a slight sliding on the rim. In order to avoid friction, we propose to use a roll 30 at the outer end of each lever, said levers being formed to receive the rolls, as shown in Fig. 4, and each roll being rotatably mounted upon a pin 44 sustained in the forked end of the lever. The load sustained by the wheel will, therefore, be supported partially by the springs 22 at the upper portion of the wheel, and partly by the springs 38 at the lower portion of the wheel, and we propose to use as many springs as necessary to support any load which the vehicle is intended to carry.

With our construction it is possible to connect any desired number of springs 38 to each lever 29.

When the wheel is sustaining a load, as shown in Fig. 2 the springs 38 at the bottom of the wheel will be under tension and the inner ends of the levers of each pair at the bottom of the wheel will be swung toward each other. The change in position between the exterior rim and the wheel body brings the stops 24 at the bottom of the wheel into a position to engage the roll 30 of one lever in each pair of levers on the lower side of the wheel, and the engagement of the rolls 30 with these stops serves to prevent creeping of the exterior rim. It will be noted that the levers 29 are so disposed that when the rolls 30 engage the stops 24, the line of thrust between the roll and the stop is substantially in line with the outer end of the lever. As the wheel turns while it is loaded, the springs will be successively brought into use as above described, thereby resiliently supporting the load as will be plain from the drawings. The overlapping of the flanges 7 and 15 makes the wheel sufficiently stiff laterally so that it will withstand any strain to which it might be put in rounding corners, etc.

To obviate friction, we propose to place plates 40 between the flanges 7 and 15 and to also make the rolls 30 hollow or provided with the oil chamber 41 which can be filled with oil, thus keeping the parts properly lubricated.

The rolls 30 are shown as fitting within the forked ends of the levers 29 and as loosely mounted on pins 44 carried by said levers. The construction herein shown makes the wheel perfectly resilient and at the same time makes it stiff enough to withstand any strain to which the vehicle may be put in rounding a corner.

The tire whether a metal tire such as shown in Figs. 1 and 2 or a rubber tire, such as shown in Fig. 3, is received between and held in place by the outer edges of the plates or flanges 15. Where the tire is a rubber tire, as shown in Fig. 3, the outer edges of these plates may be curled over, as shown at 60, to form beads which are received within grooves formed in the edges of the rubber tire 20. This same construction can be employed whether the tire is of metal or of some other material than rubber. The tire can be readily removed by simply loosening the bolts 18 and removing either one of the flanges 15.

While we have shown one embodiment of our invention, we do not wish to be limited to the construction illustrated.

Having fully described our invention, what we claim as new and desire to secure by Letters Patent is:—

1. In a resilient wheel, the combination with a wheel body, of an exterior rim separate therefrom, a plurality of angular levers pivoted intermediate of their ends to the wheel body and arranged in pairs, the levers of each pair being oppositely disposed and the outer ends of the levers being adapted to bear against the inner face of the exterior rim, and a contracting spiral spring connected to the inner end of each lever and to the wheel body, said springs tending to draw the inner ends of the levers of each pair toward each other.

2. In a resilient wheel, the combination with a wheel body, of an exterior rim separate therefrom, a plurality of bent levers pivoted intermediate of their ends to the wheel body and arranged in pairs, the levers of each pair being oppositely disposed and the outer ends of the levers being situated within the exterior rim and adapted to bear against the inner face thereof, springs acting on the inner end of each lever and tending to swing the outer end thereof outwardly toward the exterior rim, and stop shoulders on the exterior rim to engage the levers successively and thereby correct the creeping tendency of the rim.

3. In a resilient wheel, the combination with a wheel body having outwardly-extending flanges, of an exterior rim separate from the body, levers pivoted intermediate of their ends between the flanges of the wheel body and situated entirely therebetween, said levers being arranged in pairs with the levers of each pair oppositely disposed, each lever carrying at its inner end a stop projection and the flanges having slots in which said projections play and by which the swinging movements of the levers are limited, and springs acting on the inner ends of the levers and tending to force said ends of the levers of each pair toward each other, the outer ends of the levers being adapted to bear against the exterior rim between said flanges.

4. In a resilient wheel, the combination with a wheel body having outwardly-extending flanges, of a rim separate from the body and having inwardly-extending flanges overlapping the flanges of the wheel body, pairs of levers pivoted between the flanges of the wheel body, the levers of each pair being faced in opposite directions, a roll carried by each lever and situated between said flanges, springs connected to said levers and operating to force the rolls against the inner side of the rim, slots in the flanges of the wheel body, and projections extending from the levers and playing in said slots thereby limiting the swinging movement of the levers.

5. In a resilient wheel, the combination with a wheel body having outwardly-extending flanges, of an exterior rim separate from the wheel body, pairs of bent levers pivoted intermediate of their ends between said flanges and situated entirely therebetween, springs connected to the inner ends of said levers and extending at substantially right angles to radial lines, said springs tending to force the outer ends thereof outwardly against the exterior rim, each lever having a stop projection, slots in the flanges in which said projections play and which serve to limit the swinging movements of the levers.

6. In a resilient wheel, the combination with a wheel body having outwardly-extending flanges provided with slots, of an exterior rim separate from the wheel body, pairs of bent levers pivoted intermediate of their ends between the flanges and received entirely therebetween, the levers of each pair being oppositely disposed, springs acting on the inner ends of the levers, each lever having a stop projection which operates in one of said slots, and stop shoulders on the exterior rim between said flanges to engage the levers successively and thereby correct the creeping tendency of the exterior rim.

7. In a resilient wheel, the combination with a wheel body, of an exterior rim separate therefrom, a plurality of radially-extending contracting spiral springs, each connected at one end to said rim and at the other end to said wheel body, a plurality of bent levers pivoted intermediate of their ends to the wheel body and arranged in pairs, the levers of each pair being oppositely disposed and the outer ends of the levers being adapted to bear against the inner face of the exterior rim, and springs acting on the inner end of each lever and tending to swing the outer end thereof outwardly, each spring extending in a direction at right angles to the radial line.

8. In a resilient wheel, the combination with a wheel body, of an exterior rim separate therefrom, a plurality of bent levers pivoted intermediate of their ends to the wheel body and arranged in pairs, the levers of each pair being oppositely disposed and the outer ends of the levers being adapted to bear against the inner face of the exterior rim, the inner ends of said levers extending in substantially radial directions, and a spring acting on the inner ends of the levers of each pair which tend to draw said ends toward each other.

9. In a resilient wheel, the combination with a wheel body, of an exterior rim separate therefrom, a plurality of levers pivoted intermediate of their ends to the wheel body and arranged in pairs, the levers of each pair being oppositely disposed, and the outer ends of the levers being adapted to bear against the inner face of the exterior rim, a pin carried by the wheel body between each pair of levers, and a spring connecting the inner end of each lever of the pair to the pin situated between said levers.

10. In a resilient wheel, the combination with a wheel body, of an exterior rim separate therefrom, a plurality of levers pivoted intermediate of their ends to one of said parts and adapted to engage the periphery of the other part, said levers being arranged in pairs and the levers of each pair being oppositely disposed, and a spring acting on one end of each lever, said springs extending in a direction at substantially right angles to a radial line.

In testimony whereof, we have signed our names to this specification, in the presence of two subscribing witnesses.

JOHN A. STAHLE.
CARL W. STAHLE.

Witnesses:
Louis C. Smith,
Thomas J. Drummond.

It is hereby certified that in Letters Patent No. 1,124,349, granted January 12, 1915, upon the application of John A. Stahle, of Boston, and Carl W. Stahle, of Everett, Massachusetts, for an improvement in "Resilient Wheels," an error appears in the printed specification requiring correction as follows: Page 3, line 100, for the article "the" read *a;* and that the said Letters Patent should be read with this correction therein that the same may conform to the record of the case in the Patent Office.

Signed and sealed this 30th day of March, A. D., 1915.

[SEAL.]

J. T. NEWTON,
*Acting Commissioner of Patents.*